Figure 1:
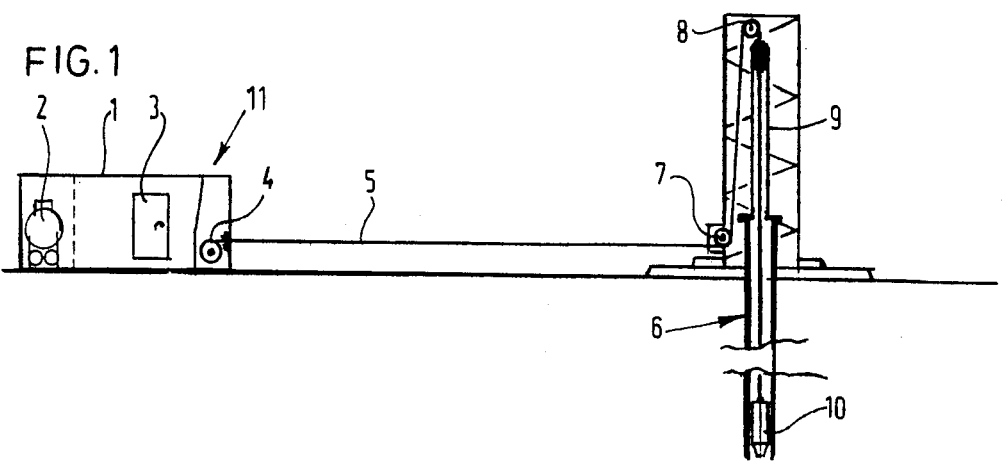

United States Patent [19]

Koopmans

[11] Patent Number: 4,727,718
[45] Date of Patent: Mar. 1, 1988

[54] WINCH SYSTEM HAVING HYDRAULIC TRANSMISSION INCLUDING A SAFETY CIRCUIT

[76] Inventor: Luitzen B. Koopmans, No. 38a, Gelkenes, 2964 AC Groot-Ammers, Netherlands

[21] Appl. No.: 755,559

[22] Filed: Jul. 17, 1985

Related U.S. Application Data

[63] Continuation of Ser. No. 397,536, Jul. 12, 1982, abandoned.

[30] Foreign Application Priority Data

Jul. 21, 1981 [NL] Netherlands ............... 8103444

[51] Int. Cl.⁴ ............................................. F16H 39/44
[52] U.S. Cl. ............................................. 60/468; 60/905
[58] Field of Search ............... 91/461; 60/459, 468, 60/489, 494, 905

[56] References Cited

U.S. PATENT DOCUMENTS

| | | | |
|---|---|---|---|
| 2,398,265 | 4/1946 | Tyler | 60/905 |
| 2,902,826 | 9/1959 | Littell et al. | 60/468 |
| 2,905,190 | 9/1959 | Oyster | 60/468 |
| 3,175,354 | 3/1965 | Firth et al. | 60/489 |
| 3,303,647 | 2/1967 | Futamata | 60/494 |
| 3,395,893 | 8/1968 | Kumpf . | |
| 3,733,813 | 5/1973 | Gordon | 60/468 |
| 3,817,033 | 6/1974 | Appel et al. | 60/905 |
| 3,864,915 | 2/1975 | Metailler | 60/905 |
| 4,194,365 | 3/1980 | Stoufflet et al. | 60/494 |
| 4,232,792 | 11/1980 | Shields . | |

FOREIGN PATENT DOCUMENTS

| | | | |
|---|---|---|---|
| 1809441 | 8/1969 | Fed. Rep. of Germany . | |
| 1508428 | 1/1968 | France . | |
| 7204143 | 10/1972 | Netherlands . | |
| 251319 | 2/1970 | U.S.S.R. | 60/459 |

*Primary Examiner*—Deborah L. Kyle
*Assistant Examiner*—Richard L. Klein
*Attorney, Agent, or Firm*—John P. Snyder

[57] ABSTRACT

A winch system comprising a cable drum coupled with a reversible hydromotor and a reversible hydropump arranged with the hydromotor in a closed circuit by means of two communication conduits, in which a safety circuit connecting the communication conduits with one another at the occurrence of pressure shocks therein is arranged and provided with one controllable relief pressure valve, whose inlet and outlet are connected with each one of the communication conduits through non-return valves allowing supply to and, respectively, drainage from the relief pressure valve.

3 Claims, 3 Drawing Figures

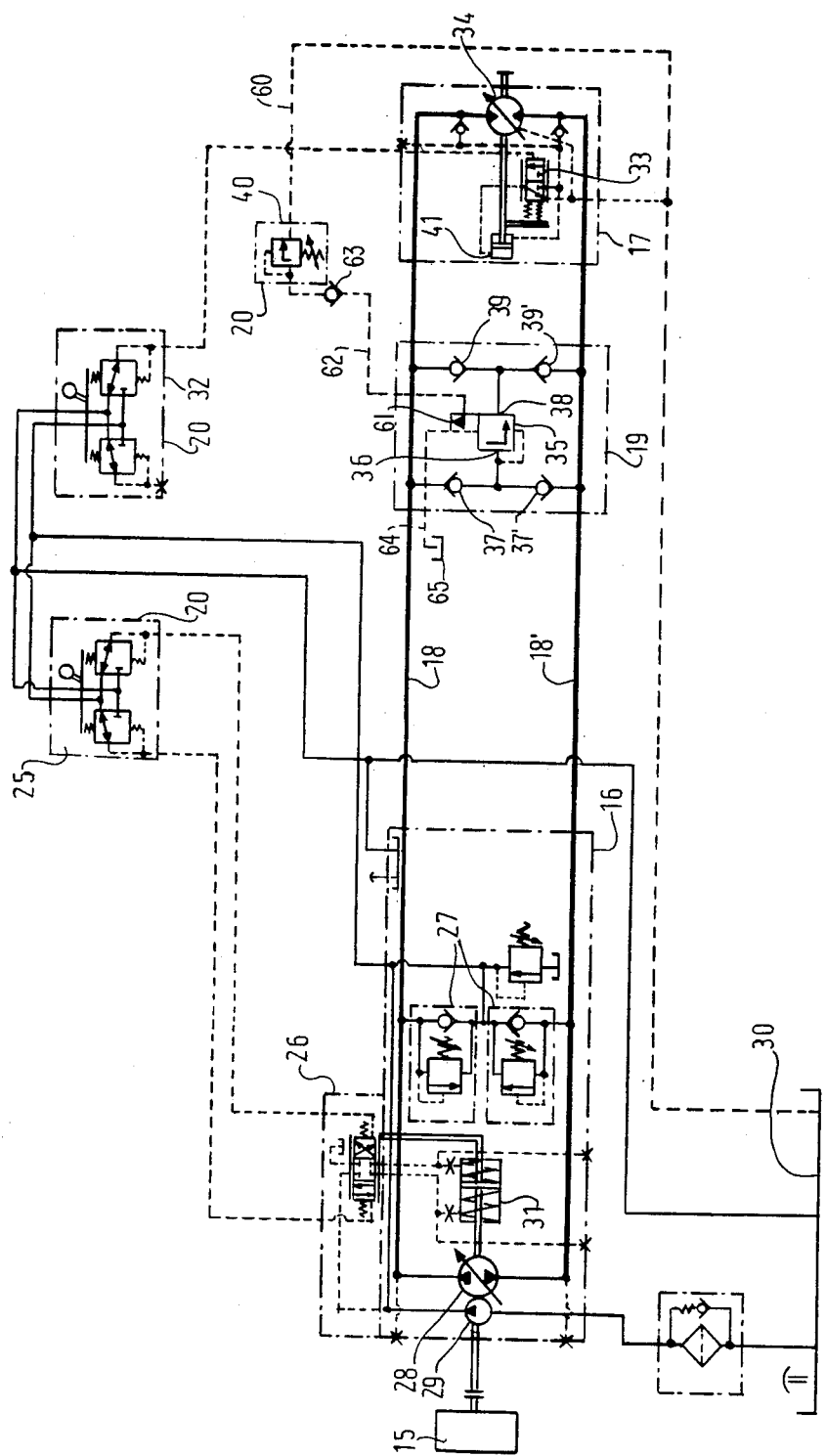

WINCH SYSTEM HAVING HYDRAULIC TRANSMISSION INCLUDING A SAFETY CIRCUIT

This application is a continuation of application Ser. No. 397,536, filed July 12, 1982, now abandoned.

The invention relates to a winch system comprising a cable drum coupled with a reversible hydromotor and a reversible hydropump arranged with the hydromotor in a closed circuit by means of two communication conduits, in which a safety circuit connecting the communication conduits with one another at the occurrence of pressure shocks therein is arranged and provided with one relief pressure valve, whose inlet and outlet are connected with each one of the communication conduits through non-return valves allowing supply to and, respectively, drainage from the relief pressure valve.

Such a system is known from FR-A-No. 1.508.428.

The safety circuit serves to prevent the cable from being exposed to an excessive force likely to cause rupture. The use of such a winch system in which the cable can be wound on and off at a very high rate requires a very sensitive safety circuit. For example, in a wire line unit it may occur that a body connected with the hoisting cable has to be moved up and down with high speed several times in the well (jarring). The switching over of the direction of movement has to be done in such a way, that the cable is not damaged.

The invention has for its object to provide a system of the kind set forth in the preamble which can safely operate under such conditions.

This is achieved in that the relief valve is controllable. The winch operator can control the relief pressure valve in a manner such that, whilst the hydropump continues supplying pressure in the normal winding-up direction of the hydromotor, the cable nevertheless winds off under the action of a tractive force exerted thereon. By increasing the opening pressure of the relief valve this winding-off movement smoothly goes over into a winding-up movement. In a wire line unit the aforesaid body can be alternately caused to perform a downward movement substantially corresponding to a free fall and an upward movement at a rate of several tens of meters per second. During these movements and the change-over thereof the safety circuit is continuously operative.

The invention will be described more fully hereinafter with reference to the accompanying drawing.

FIG. 1 shows an arrangement embodying the invention used as a wire line unit.

Figure 2:
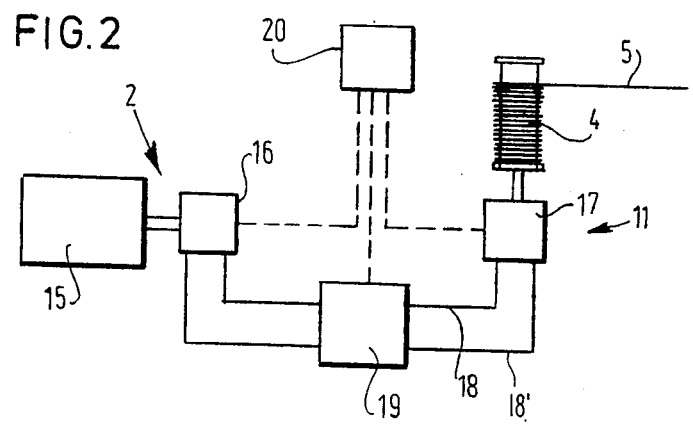

FIG. 2 schematically shows the winch system of FIG. 1.

FIG. 3 schematically shows the hydraulic control of the winch system.

Referring to FIG. 1 the winch system 11 accommodated in a so-called "container" 1 only shows a cable drum 4, along which passes a cable 5, and an oil pump aggregate 2 fed from a Diesel system. The container 1 has a door 3 leading to the control-cabin. The cable 5 passes to the interior of a well 6 via a first cable pulley 7 and a second cable pulley 8 supported at a given distance above the well 6 by a stand 9. With the free end of the cable 5 located inside the well 6 is coupled a body 10, the movements of which inside the well 6 have to be controlled by means of the winch system. Since the well itself, the associated equipment 7, 8, and 9 and the body 10 do not form part of the invention, neither with respect to their construction nor with respect to their modes of operation, the details thereof will not be discussed further.

FIG. 2 schematically shows that the winch system 11 comprises an oil pump aggregate 2 having a Diesel engine 15 and a hydropump device 16 mechanically coupled with the former. Through communication conduits 18 and 18' the hydropump 16 is included in a closed circuit with a hydromotor 17. The output shaft of the hydromotor 17 is mechanically coupled with a cable drum 4, on which the cable 5 is wound. Between the communication ducts 18 is arranged a safety circuit 19, which can put the conduits 18 into relative communication in order to mitigate the influence of pressure shocks and to avoid the occurrence of given excessive pressure during operation. The hydropump device 16, the safety circuit 19 and the hydromotor device 17 are controlled by a control-device 20.

From FIG. 3 it will be apparent that the hydromotor 17 as well as the hydropump 16 are of the reversible, controllable type. The hydropump device 16 comprises the hydromotor 28 mechanically coupled with the engine 15, an auxiliary pump 29 also coupled with the engine 15, safety members 27 by which the maximum pressure occuring in the hydraulic system is set, and a control-member 31 for controlling the hydropump.

The fluid displacement and the direction of operation of the hydropump 28 are controlled with the aid of the pump control 25. This pump control 25 sets in a manner known per se the position of the control-member 31 through a servo-valve 26.

The auxiliary pump 29 supplies the pressure for the control-device 20 and ensures supplementing the hydraulic cycle. The auxiliary pump 29 draws oil from the reservoir 30, whereas the outlet oil from the various hydraulic members is fed back to the reservoir 30.

The hydromotor device 17 comprises a hydromotor 34 and a control-member 41 for the same. By the control-member 41 the speed of rotation of the motor 34 for a given oil supply is controlled. The control-member 41 is governed in known manner with the aid of a motor control 32 and a servo-valve 33.

The safety circuit 19 comprises a relief pressure valve 35. The inlet 36 of the relief valve 35 communicates through non-return valves 37 and 37' with each one of the communication conduits 18. The non-return valves 37 and 37' are arranged so that they pass an effluent from the conduits 18 or 18' to the inlet 36 of the valve 35. The outlet 38 of the valve 35 also communicates through non-return valves 39 and 39' with each one of the communication conduits 18 and 18'. The non-return valves 39 are arranged so that they pass an effluent of oil from the outlet 38 towards the communication ducts 18 or 18'. The relief valve 35 can be controlled in a manner known per se by means of a control valve 40 to be actuated by the operator.

In accord with convention, with respect to the operator controlled valve 40 and the controlled relief valve 35, control fluid lines are illustrated in dashed lines whereas controlled fluid lines are illustrated in full lines. Thus, the operator controlled valve 40 controls the bleed of control fluid from the line 62, through the check valve 63 and through the line 60 to the reservoir 30. This controlled bleed causes the pilot valve 61 to bleed fluid from the relief valve 35 over the line 64 to the reservoir 65, thus changing the pressure differential across the relief valve 35 to which it responds. If the pressure in the main line 18 is greater than that in the main line 18' by an amount exceeding the pressure differential to which the relief valve responds, fluid may short circuit from the main line 18, through the check valve 37, the relief valve 35 and the check valve 39' to the other main line 18'. A pressure differential in the opposite direction, again exceeding the pressure differential to which the relief valve 35 responds, short circuits hydraulic fluid between the main lines through the check valve 37' the relief valve 35 and the check valve 39. It will be noted, first of all, that the first bypass path comprising the serial path through the check valve 37, the relief valve 35 and the check valve 39' serves continuously to protect against the condition in which the main line 18 pressure exceeds the main line 18' pressure by an amount exceeding the value to which the relief valve 35 has been set to respond; and, conversely, the second bypass path through the serial connection of the check valve 37', the relief valve 35 and the check valve 39 protects continuously against the condition in which the pressure in the main line 18' exceeds that in the other main line 18 by such amount as aforesaid. Additionally, the pressure differential across the relief valve to which it responds as set by the operator serves a very important control function heretofore unknown in this art. That is, the adjustable pressure relief valve 35 allows the operator to leave the hydropump in a constant output mode and the hydromotor in a constant setting mode whereby the hydropump will be driven in the cable winding direction at a speed which imparts a maximum upward velocity to the tool suspended by the cable when the relief valve is set to its maximum pressure differential. With the hydropump and hydromotor so set, the operator, merely by controlling the pressure differential to which the relief valve 35 responds, may control the power delivered to the hydromotor at any pressure differential value between a low value corresponding to a low set pressure differential across the relief valve 35 which allows the tool or load to free fall (i.e., as is required in "jarring") and a high value (less than the value at which destructive tension could be imposed on the cable) corresponding to maximum power delivery to the hydromotor (and consequent maximum winding speed of the hydromotor). In this way, the valve 35 may be switched from the low value to allow the tool to free fall until it is bottomed and then to the high value to impart maximum upward acceleration to the tool until it reaches its maximum upward velocity. During the time when the tool is being subjected to maximum acceleration from bottomed standstill to its maximum upward velocity, the high value at which the relief valve is set by the operator protects the cable from destructive tension while at the same time assuring that acceleration is the maximum possible within that constraint.

The invention is not limited to its application to a winch system with the disposition shown in FIG. 2. The invention may be satisfactorily applied to other winch arrangements, for example, an arrangement as described in Dutch Patent Application No. 8100506. The winch arrangement disclosed herein comprises two hydropump devices and hydromotor devices coupled wherewith, the hydromotors being both coupled by means of a planetary gear wheel system with the cable drum. In both cycles a safety circuit embodying the invention can be included. The relief valves 35 can then be controlled by one and the same control-valve.

What is claimed is:

1. A winch system comprising the combination of:

a hydrostatic pump and drive means for driving said pump continuously to deliver a predetermined flow rate of hydraulic fluid corresponding to a vertically upward maximum speed of a tool controlled by the winch system;

a hydrostatic motor and a cable drum driven by said motor, a cable wound on said drum and a tool connected to said cable so that the tool may be moved vertically;

a fluid feed line extending from said pump to said motor and a fluid return line extending from said motor to said pump to establish closed fluid connection between said pump and said motor; and control means for controlling the power delivered from said pump to said motor independently of said predetermined flow rate of hydraulic fluid continuously delivered by said pump, said control means comprising flow path means extending back and forth between the fluid feed line and the fluid return line for automatically diverting fluid from said feed line to said return line in response to a pressure difference existing between said lines which exceeds a variable limit whose maximum value is less that that value which could impose destructive tension in the cable, and operator controlled means for changing said variable limit to any value between a low value at which the tool is free falling and said maximum value at which the tool is subjected to maximum upward acceleration from a bottomed standstill after free falling until the maximum upward speed of the tool is attained whereby the motion imparted to said tool may converted smoothly by the operator from said vertically upward maximum speed to a free falling downward motion and smoothly from a tool bottomed standstill with maximum upward acceleration to said vertically upward maximum speed without creating destructive tension in said cable and without altering the predetermined flow rate delivered by the pump.

2. In a winch system including a winch drum, a cable wound on said drum and having a load attached thereto for raising and lowering in response respectively to reeling in and paying out of the cable on the drum, a hydraulic motor drivingly connected to said drum and rotatable in one direction to reel in the cable and in the opposite direction to pay out the cable, a hydraulic pump which may be operated in constant speed mode, a closed hydraulic circuit connecting said pump with said motor to circulate hydraulic fluid back and forth between said pump and said motor, and control means in said hydraulic circuit between said pump and said motor in parallel relation therewith for short circuiting the flow of hydraulic fluid from said pump to said motor so as to control the power delivered from said pump to said motor, said control means including a relief valve short circuiting the flow of hydraulic fluid in response to pressure differential across said relief valve and operator controlled means connected with said relief valve for varying the pressure differential across said relief valve to which said relief valve responds to short circuit the hydraulic fluid, said operator controlled means being effective to vary the pressure differential across the relief valve to which the relief valve responds to short circuit the hydraulic fluid to any value between a low value and a high value which is less than that value which could impose destructive tension on the cable to control the hydraulic power delivered from said pump to said motor between a low power state corresponding to said low value and in which the motor is rotated in said opposite direction while the load is substantially free falling, through an intermediate power state corresponding to an intermediate value of the pressure differential and in which the weight of the load mat be stationarily suspended and a high power state corresponding to said high value in which the motor is driven by the pump at a high speed in said one direction to raise the load at a high speed, all without requiring any change in the speed at which the pump is operated.

3. A hydraulic winch system for controlling both the winding and unwinding rotation of a winch drum having a cable wound thereon while protecting the cable against potentially destructive tensile stress due to hydraulic pressure surges in the system which exceed a maximum permissible pressure, said system comprising a winch drum, a cable wound on the drum for suspending a load, a hydraulic pump having input drive means, a hydraulic motor connected with the drum to rotate therewith, a first hydraulic fluid main flow line connected to receive hydraulic fluid delivered by the pump and deliver it to the motor to impart load-raising rotation to the drum which establishes a predetermined maximum load-raising velocity, a second hydraulic fluid main flow line connected to return hydraulic fluid from the motor to the pump, bypass flow means connected between the first and second main flow lines in parallel with the hydraulic pump and hydraulic motor for variably controlling hydraulic fluid bypass flow back and forth between the main flow lines, the bypass flow means comprising a first serial connection of a first check valve, a variable pressure relief valve, and a second check valve in which the first and second check valves are oriented to pass hydraulic fluid from the first main flow line and through the variable pressure relief valve to the second main flow line in response to pressure differential existing between the first and second main flow lines which exceeds the relief pressure at which the variable pressure relief valve is set, and a second serial connection of a third check valve, the variable pressure relief valve and a fourth check valve in which the third and fourth check valves are oriented to pass hydrualic fluid from the second main flow line through the variable pressure relief valve to the first main flow line in response to pressure differential existing between the second and first main flow lines which exceeds the relief pressure at which the variable pressure relief valve is set, and control means for varying the pressure at which hydraulic fluid will pass through the variable pressure relief valve between a lower pressure limit at which substantially all of the hydraulic fluid delivered by the hydraulic pump plus hydraulic fluid delivered by the motor as the drum is rotating in load-lowering direction is passed through the first serial connection to permit substantially free-fall of the load and an upper pressure limit less than the maximum permissible pressure and at which upper pressure limit all the hydraulic fluid delivered by the hydraulic pump which does not impose a pressure differential across said main lines exceeding the upper pressure limit flows through the hydraulic motor to impart maximum load-raising acceleration and, ultimately, maximum load-raising velocity, whereby transition from a bottomed condition of the load after free fall thereof to the maximum load-raising velocity is effected as rapidly as possible without exceeding the potentially destructive tensile stress in the cable.

* * * * *